Oct. 22, 1968 A. A. AKIN, JR 3,406,455
TELESCOPE MOUNTING FOR FIREARMS
Filed Aug. 1, 1966 5 Sheets-Sheet 1

INVENTOR.
ALFRED A. AKIN JR.
BY
Christie, Parker & Hale
ATTORNEYS

INVENTOR.
ALFRED A. AKIN JR.
BY
Christie, Parker & Hale
ATTORNEYS

Oct. 22, 1968   A. A. AKIN, JR   3,406,455
TELESCOPE MOUNTING FOR FIREARMS
Filed Aug. 1, 1966   5 Sheets-Sheet 3

INVENTOR.
ALFRED A. AKIN Jr.
BY
Christie, Parker & Hale
ATTORNEYS

Oct. 22, 1968         A. A. AKIN, JR         3,406,455
            TELESCOPE MOUNTING FOR FIREARMS
Filed Aug. 1, 1966                     5 Sheets-Sheet 4

INVENTOR.
ALFRED A. AKIN JR.
BY
Christie, Parker & Hale
ATTORNEYS

Oct. 22, 1968   A. A. AKIN, JR   3,406,455
TELESCOPE MOUNTING FOR FIREARMS
Filed Aug. 1, 1966   5 Sheets-Sheet 5

INVENTOR.
ALFRED A. AIKIN, JR.
BY
Christie Parker & Hale
ATTORNEYS.

United States Patent Office 3,406,455
Patented Oct. 22, 1968

3,406,455
TELESCOPE MOUNTING FOR FIREARMS
Alfred A. Akin, Jr., West Covina, Calif.,
assignor to David P. Bushnell
Continuation-in-part of application Ser. No. 534,117,
Mar. 14, 1966. This application Aug. 1, 1966, Ser.
No. 573,742
30 Claims. (Cl. 33—50)

ABSTRACT OF THE DISCLOSURE

A mounting apparatus for securing a telescope sight to a firearm such as a rifle. The apparatus includes a pin which threads into a factory-tapped hole in the firearm. The pin has a portion which extends from the firearm, and the telescope has a socket which receives the pin in clamping engagement, the pin and socket being closely fitted longitudinally so the pin locks the telescope in position longitudinally during recoil shock of the firearm. A separate clamp means is longitudinally spaced from the pin, and is secured to the telescope and engaged in another tapped hole in the firearm. The apparatus is characterized by being directly mountable on a variety of different firearms without any need for auxiliary spacers or adapters, and can be installed by the firearm user without any need for skilled services of a gunsmith.

*Cross reference to related application*

This is a continuation-in-part of co-pending application Ser. No. 534,117 filed Mar. 14, 1966.

*Background of the invention*

Telescope sights are widely used to facilitate accurate aiming of rifles, and are also useful on pistols, shotguns, and other firearms. Such a telescope typically includes an optical system having objective and ocular lens systems, and a reticle disposed between and at the focal plane of the lens systems. The reticle is superimposed over an image of the target, eliminating the need for the shooter to shift eye focus between the firearm sight and the target.

The telescope optical system may provide a magnified target image, but magnification is not an essential feature. For purposes of this application, any optical sighting apparatus having a reticle which is superimposed between an ocular and an objective lens system will be referred to as a telescope.

The telescope is typically mounted on the firearm receiver, which is that part of the firearm frame that houses the firearm action and receives the breach end of the barrel. In a bolt-action rifle, the receiver is divided into a receiver ring which encloses the front of the bolt and the breech end of the barrel, and a receiver bridge located behind the receiver ring and breech opening.

Almost all modern firearms are provided by the manufacturer with tapped holes in the receiver to facilitate mounting of a telescope. A bolt-action rifle typically includes two longitudinally spaced holes in the receiver ring, and two longitudinally spaced holes in the receiver bridge.

While these factory drilled and tapped holes somewhat simplify the task of securing a telescope to a rifle, the lack of a standard spacing and location of the mounting holes has prevented the use of a standard mounting apparatus which is adaptable to many different types of firearms. For example, the spacing between the holes in the receiver bridge varies considerably between different firearms, and there is also some variation of the spacing of the two holes in the receiver ring. The spacing between the sets of holes in the receiver bridge and ring is also a variable. Furthermore, the receiver ring and bridge are often a different levels, and may have different radii.

The result of this non-standard location of mounting holes, as well as the variations in receiver heights and radii, has been that gunsmiths have been forced to stock different styles of telescope mount bases for each model of firearm manufactured. The proper maintenance of this inventory of mounting apparatus requires a considerable investment by the gunsmith, as well as posing a constant stocking and reordering problem. From the users standpoint, existing mounts not only lack interchangeability, but may require expensive, custom installation by a skilled gunsmith.

The telescope mounting apparatus of this invention is adapted to secure a telescope to almost any rifle or other conventional firearm without the use of special mount bases for each firearm model or other custom-fitting apparatus. This universality is a significant advantage because it eliminates the disadvantages discussed above. Variations in mounting-hole spacing and height are compensated for by the telescope mounting, and receiver radius variations pose no problem in securing the mount to the firearm. The telescope is securely held to the rifle in accurate alignment, but can be readily removed for interchangeable use on other firearms. The mount is simple and inexpensive to manufacture with conventional machine tools.

Briefly stated, the telescope mounting of this invention comprises a pin adapted to be secured in one of the receiver holes, an elongated block adapted to be secured in another of the receiver holes and longitudinally spaced from the pin, and a telescope having a socket and having clamp means spaced from the socket. The pin includes a telescope-engaging portion which extends above the receiver when the pin is secured to the receiver. The telescope socket is dimensioned to fit snugly over the telescope-engaging portion of the pin whereby there is substantially zero longitudinal freedom between the socket and the pin, providing a positive stop to secure the telescope against longitudinal movement in response to recoil shocks. The block has a pair of sides which extend above the receiver, and at least one of the sides has a longitudinally elongated groove. The telescope clamp means is engageable in the block groove for clamping the telescope to the block.

In another form, the block may include a pair of upwardly diverging sides which are engageable with the clamp means. A post is adjustably secured to the top of the block, and a lower portion of the telescope abuts the top of the post when the clamp means are secured to the block. In yet another form, the mounting comprises a pair of pins adapted to be secured in a pair of spaced-apart holes in the receiver, and the telescope includes a pair of socket portions adapted to fit snugly over the pins. Each pin has a portion formed as an inverted truncated cone which extends above the receiver, and a pair of opposed screws are threaded laterally through each of the portions of the telescope into the sockets to bear on opposite sides of the conical portion for clamping the telescope against the receiver.

The invention will be described in detail with reference to the attached drawings, in which.

Figure 1:
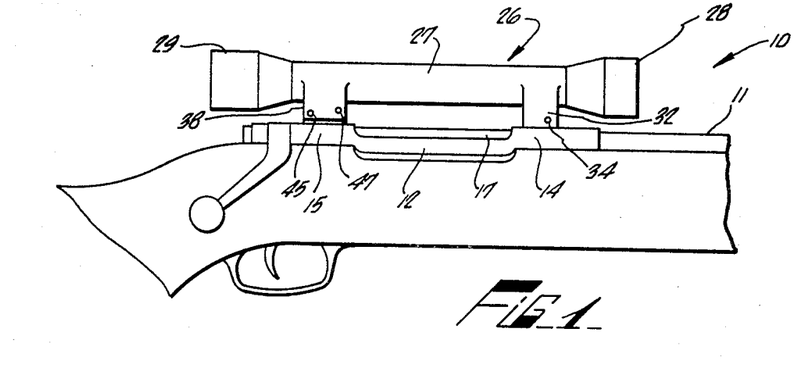
FIG. 1 is an elevation of a portion of a rifle, and a telescope secured to the rifle by the mounting of this invention.
Figure 2:
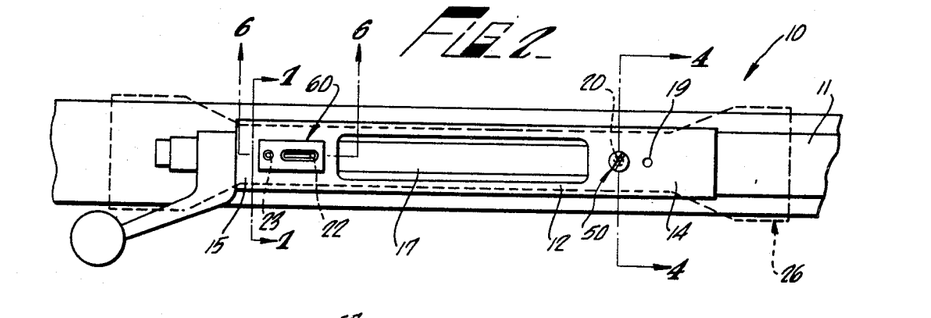
FIG. 2 is a top view of the rifle shown in FIG. 1, with the telescope shown in phantom.

Referring to FIGS. 1 and 2, the frame of a bolt-action rifle 10 includes a barrel 11 and a receiver 12 at the breech end of the barrel. At the forward end of the receiver is a receiver ring 14 which receives the barrel. The rear end of the receiver forms a receiver bridge 15, and a breech opening between the receiver ring and bridge is occupied by a bolt 17.

Figure 6:
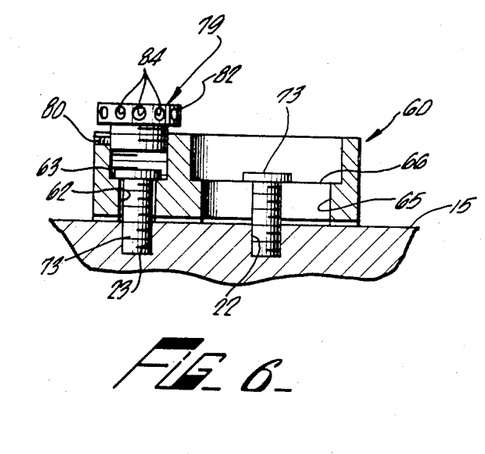
FIG. 6 is a view of the mounting block along line 6—6 of FIG. 2.

The receiver ring includes a pair of longitudinally spaced holes 19 and 20. As shown in FIG. 6, the receiver bridge also includes a pair of longitudinally spaced holes 22 and 23. Almost all modern rifles include these holes which are drilled and tapped by the rifle manufacturer to accept a 6–48 screw. While these pre-drilled and tapped holes greatly facilitate the mounting of a telescope to a rifle, there is an unfortunate lack of standardization in hole location and spacing.

For example, in the majority of modern rifles, holes 19 and 20 are spaced apart 0.860 inch. However, there are other rifles in which these holes are spaced apart 0.605 inch, and even other spacings may be found. There is even less standardization in the location of holes 22 and 23 which may be spaced apart by a distance varying from about 0.3 inch up to 1 inch. An even more significant variation exist in the spacing of the pair of holes in the receiver ring from the pair of holes in the receiver bridge. Furthermore, the top surfaces of the receiver ring and bridge may be located at different levels, introducing yet another variable into the mounting problem.

A telescope 26 is shown in FIG. 1 as secured to rifle 10 by a mounting formed according to the invention. The telescope includes a central barrel 27, an objective-lens housing 28 secured to the forward end of the barrel, and an ocular-lens housing 29 secured to the rear end of the barrel. An erector-lens system and a reticle (not shown) are enclosed within barrel 27, and conventional reticle adjusting means (not shown) are provided for introducing windage and elevation adjustments in the telescope.

Figure 4:
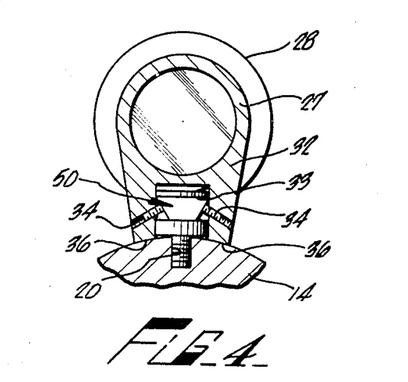
FIG. 4 is a view along line 4—4 of FIG. 2.
Figure 5:
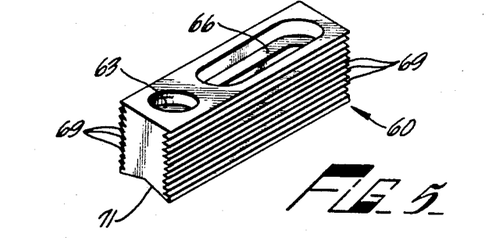
FIG. 5 is a perspective view of a mounting block formed according to the invention.

Extending downwardly from the forward part of the telescope barrel is a socket portion 32. As seen in FIG. 4, the undersurface of the socket portion is bored to define a circular socket 33. A pair of laterally opposed setscrews 34 are threaded through opposite sides of the socket portion to extend inwardly and upwardly into the socket. A bottom face 36 of the socket portion is bevelled slightly to fit snugly against a receiver ring of a rifle.

Preferably, the socket portion is formed integrally with the telescope barrel, eliminating separate split-clamp rings which are used in conventional telescope mountings. Such clamp rings add to the complexity of a telescope mounting, and must be selected for one specific barrel diameter. There is also a tendency for the barrel to slip within such clamping rings, upsetting the eye-relief positioning of the telescope, and causing the reticle to rotate away from a desired position. These difficulties are eliminated by an integrally formed socket portion because the barrel is fixed with respect to the socket portion.

A pair of laterally spaced lower portions 38 are spaced rearwardly from the socket portion and extend downwardly from the barrel. Preferably, the lower portions are integrally formed with the barrel to eliminate the disadvantages of conventional split-clamp rings as discussed above.

Figure 7:
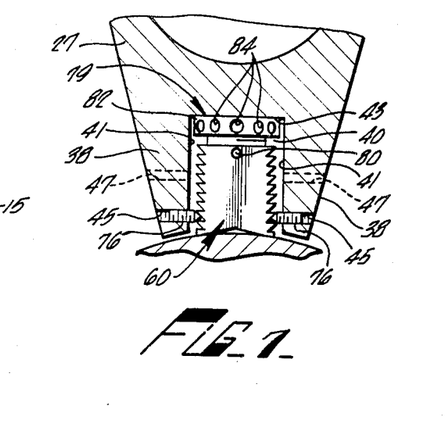
FIG. 7 is a view along line 7—7 of FIG. 2.

As best seen in FIG. 7, a longitudinally elongated, open-ended recess 40 is formed by inner faces 41 of lower portions 38 and a flat undersurface 43 of the telescope barrel. A pair of laterally opposed, threaded holes 45 are formed through the lower portions adjacent their lower rear ends, and a second pair of laterally opposed, threaded holes 47 are formed above and longitudinally forward of holes 45 through the lower portions.

Figure 3:
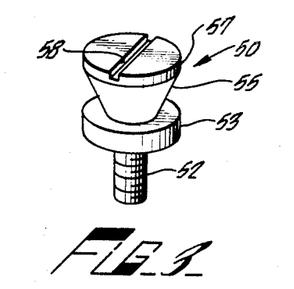
FIG. 3 is a perspective view of a pin as used in the mounting.

Referring to FIG. 3, a circular pin 50 includes a threaded lower portion 52 extending downwardly from a base 53, and a telescope-engaging portion 55 extending upwardly from the base. The telescope-engaging portion is formed as an inverted, truncated cone. A top portion 57 of the pin extends upwardly from the base of the inverted cone, and has a diameter equal to the diameter of base 53. The diameter of top portion 57 and base 53 is chosen to be a snug, sliding fit in socket 33 in the telescope, and threaded portion 52 is dimensioned to engage the threads in hole 19 or 20. The upper surface of the top portion has a screwdriver slot 58.

An elongated block 60, seen in FIGS. 2, 5, 6, and 7, includes a vertical (as viewed in FIG. 6) hole 62 therethrough. The upper part of hole 62 is counterbored to form a shoulder 63. A longitudinally elongated slot 65 is cut vertically through the forward part of block 60, and the upper part of the slot is recessed to form a shoulder 66.

The block has a pair of upright sides which include a plurality of generally V-shaped grooves 69 along the length of the block. The two sets of grooves are in lateral alignment such that a horizontal plane passing through the apex of a groove on one side of the block will also pass through the apex of a corresponding groove on the other side of the block. Preferably, a bottom surface 71 of the block is formed in a shallow V-shape so the block may fit snugly against the receiver bridge of a rifle.

To assemble the telescope mounting, block 60 is secured to the receiver bridge of rifle 10 by a pair of screws 73. One of the screws is slipped through hole 62 and threaded into hole 23 in the receiver bridge, and the head of this screw abuts shoulder 63. The second screw passes through slot 65 in the block and is threaded into hole 22 in the receiver bridge, the head of the screw abutting shoulder 66. Differences in longitudinal spacing of holes 22 and 23 in the receiver bridge are accommodated by varying the position of screw 73 along slot 65.

Pin 50 is then threaded into either hole 19 or hole 20 in the receiver ring. The choice between these two holes is dictated by the spacing between the receiver ring and bridge in the particular rifle in use. If the spacing is large, rear hole 20 will be selected to keep the distance between the pin and block within reasonable limits. If the spacing between the receiver ring and bridge is small, front hole 19 will be selected to insure proper spacing of the pin and block.

Telescope 26 is then positioned over the pin and block against the receiver. Screws 34 in the socket are tightened evenly against conical telescope-engaging portion 55 of the pin. As these screws are tightened, lower face 36 of the socket portion is drawn snugly against the top of the receiver ring. Binding of the screws is avoided by making the longitudinal axes of the screws approximately perpendicular to the surface of the conical section. As described above, pin 50 makes a snug, piston-cylinder fit within socket 33, and the telescope is thereby secured against longitudinal movement in response to recoil shocks from the rifle. These shocks are absorbed by the pin, and are not imposed on setscrews 34 as these screws are threaded laterally against the pin.

If desired, socket 33 may have an oblong shape which provides lateral clearance between the socket and the pin, permitting differential adjustment of screws 34 to introduce a windage adjustment in the telescope position. However, the socket should make a snug fit against the front and back surfaces of the pin to eliminate any longitudinal freedom, thereby insuring that recoil shocks will be absorbed by the pin.

The telescope is then secured against block 60 by threading a pair of conically pointed screws 76 (see FIG. 7) through holes 45 or 47 into a pair of grooves 69 in the sides of the block. As these screws may be tightened anywhere along the length of the grooves, variations in spacing between the receiver bridge and receiver ring are automatically compensated. This spacing, as well as any difference in height of the receiver ring and bridge, will dictate the choice of holes 45 or holes 47. The provision of several sets of holes insures that screws 76 can always be tightened against the block grooves in spite of extreme height or spacing differences between the receiver ring and bridge.

The telescope is thus tightly secured against longitudinal motion by the pin and socket, and is further secured against vertical motion by screws 76 and grooves 69. An even more rigid mounting may be provided by threading a post 79 into the upper counterbored portion of hole 62 as shown in FIGS. 6 and 7. The counterbored portion is threaded to accept the post, and a setscrew 80 is threaded longitudinally through the back of block 60 to abut and lock the post in place. The top of the post includes an enlarged flat-topped head 82, and a number of angularly spaced holes 84 are drilled laterally through the head.

After the pin and socket portion of the mount have been tightened snugly together, the post is rotated to move the top of head 82 against flat undersurface 43 of the telescope. As suggested in FIG. 7, the post is accessible from the rear of lower portions 38, and a thin elongated member may be inserted in holes 84 to rotate the post to the proper height setting. Screws 76 are then tightened into the block grooves, pulling the telescope down securely against the top of the post. The slight lateral clearance between the sides of the block and inner faces 41 of lower portions 38 permits a windage adjustment of the telescope position by differential adjustment of screws 76.

Figures 8, 9:
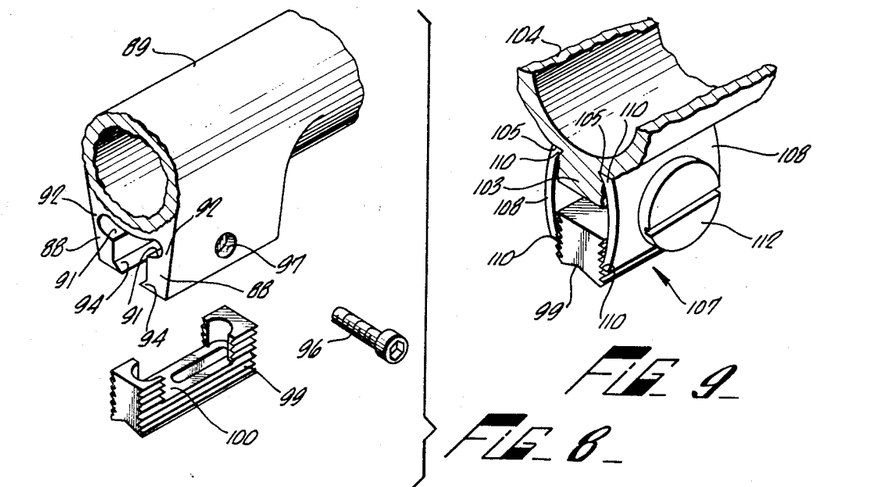
FIG. 8 is a perspective view of an alternative form of a mounting block and telescope clamp.
FIG. 9 is a perspective view of another alternative form of the mounting block and telescope clamp.

FIG. 8 shows another form of a clamp for securing the telescope against the block. A pair of lower portions 88 are integrally secured to and extend below a telescope barrel 89. The upper inner face of each lower portion includes a recess 91 along its length, forming a thin section 92 which makes the lower portions slightly resilient so they may be flexed toward each other. The inner lower face of each portion 88 is angled downwardly and inwardly to form a longitudinally elongated clamping tooth 94. A clamping screw 96 is inserted through a counterbored clearance hole 97 in one of the lower portions, and extends laterally beneath the telescope barrel to be threaded into a threaded hole (not shown) in the other lower portion.

A block 99 suitable for use with the clamp just described is identical to block 60 except the midsection of block 99 has a recess 100 to provide clearance for clamping screw 96. The telescope is installed on the receiver with lower portions 88 extending downwardly adjacent opposite sides of block 99. After the pin and socket portion of the mounting are secured together, clamping screw 96 is tightened to draw the lower portions toward each other, engaging clamping teeth 94 in the elongated grooves in the block.

Another form of the invention is shown in FIG. 9, and includes a block identical to block 99 just described. A single lower portion 103 is formed integrally with and extending downwardly from a telescope barrel 104. A longitudinal groove 105 is formed along each side of lower portion 103 where it joins the telescope barrel. A split clamp 107 includes a pair of laterally opposed clamping plates 108. The upper and lower longitudinal edges of each clamping plate extend inwardly to form a pair of clamping teeth 110. A clamping screw 112 extends through a clearance hole in one of the clamping plates and is threaded into a threaded hole in the other of the clamping plates.

As shown in FIG. 9, the clamping plates are arranged on opposite sides of the block and lower portion with the clamping teeth engaged in grooves 105 and the longitudinal grooves in the block. Clamping screw 112 is then tightened to draw the clamping plates toward each other and into tight engagement in the grooves, whereby the telescope barrel and lower portion are clamped to the block.

Figure 10:
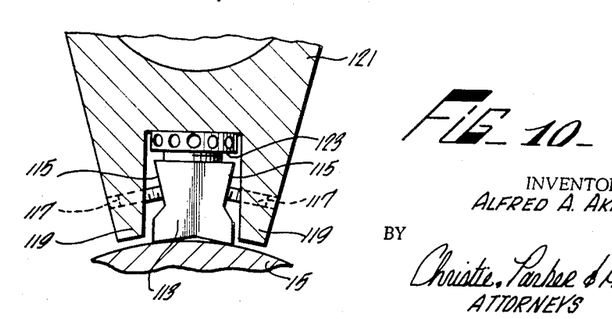
FIG. 10 is an end view of yet another form of mounting block and telescope clamp.

Another alternative form of the invention is shown in FIG. 10, and includes a block 113 secured to the receiver bridge of a rifle. This block is similar to block 60 described above, except block 113 has a pair of longitudinally extending sides 115 which slope inwardly and downwardly toward each other and toward the receiver bridge. A pair of clamping screws 117 are threaded through opposite lateral sides of a pair of lower portions 119 which are secured to and extend downwardly from a telescope barrel 121. Tightening the clamping screws against the inwardly sloping faces of the block draws the telescope down snugly against a post 123 threaded into the top of the block. Post 123 may be identical to post 79 as already described.

Figure 11:
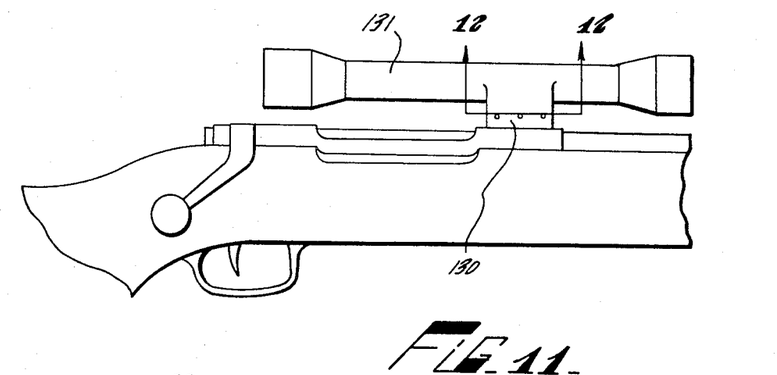
FIG. 11 is an elevation of a double-pin mounting and telescope clamp.
Figures 12, 13:
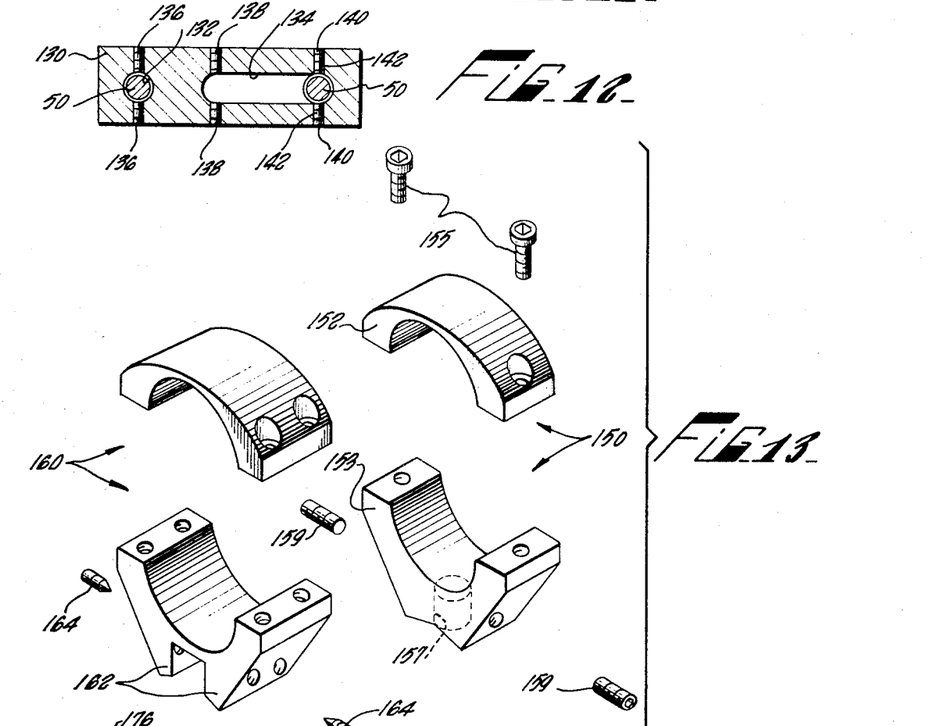
FIG. 12 is a view along line 12—12 of FIG. 11.
FIG. 13 is a perspective view of a set of telescope clamp rings adapted to be secured to the pin and mounting block of this invention.

FIGS. 11 and 12 show a mount using a pair of pins 50 threaded into a pair of longitudinally spaced holes in the receiver ring of a rifle. A lower portion 130 is secured to and extends downwardly from a telescope barrel 131. The lower portion includes a round socket 132 (formed identically to socket 33 described above) which fits snugly over the rearmost one of the pins. Spaced forwardly from socket 132 is a longitudinally elongated slot 134 which fits over front pin 50.

A pair of setscrews 136 are threaded through opposite lateral sides of the lower portion into socket 132 to secure the lower portion against the rear pin. A first set of laterally opposed threaded holes 138 extend through opposite sides of the lower portion to extend into elongated slot 134. Holes 138 are longitudinally spaced 0.605 inch from the lateral centerline of socket 132 to engage the front pin in rifles which have a 0.605 inch center-to-center spacing of the tapped holes in the receiver ring. A second set of laterally opposed tapped holes 140 extend through opposite sides of the lower portion into elongated slot 134, and are spaced from the lateral centerline of socket 132 by 0.860 inch to accommodate rifles which have this center-to-center spacing in the receiver ring. In the installation illustrated in FIG. 12, the pins are engaged in a pair of holes which are spaced at 0.860 inch, and a pair of setscrews 142 are threaded into holes 140 to secure the lower portion against the front pin.

Although the telescope mounting of this invention has been described with reference to mounting clamps which are formed integrally with the telescope barrel, the concept of the invention is also useful with separate mounting clamps which may be secured around a telescope barrel. Such separate mounting clamps will hereinafter be described as "clamp rings," and this term is to be understood as defining any separate clamps which are secured around a telescope barrel, and which can be adjustably positioned along the length of the barrel. That is, the term is intended to describe two-piece split clamps which separate to be installed around the barrel, as well as continuous-ring clamps which are slipped over the end of the barrel (after removing the ocular or objective lens housing) and secured in place by a setscrew or other conventional means.

A pair of clamp rings are shown in FIG. 13. A front clamp ring 150 includes an upper half 152 and a lower half 153 which are dimensioned in a conventional manner to fit around a telescope barrel. The clamp halves are secured together by a pair of screws 155 which pass through the upper half to thread into the lower half. A socket 157 is formed in the undersurface of lower half 153 to fit over a pin 50 (see FIG. 3). Socket 157 is identical to socket 33 already described. A pair of opposed screws 159 extend through the sides of lower half 153, to secure the front clamp ring to a pin 50 threaded into a rifle receiver.

A rear clamp ring 160 is similar to front clamp ring 150, but includes a pair of lower portions 162 which extend downwardly from the bottom of the clamp ring to fit over the sides of a block such as block 60 already described. A pair of laterally opposed setscrews 164 are threaded through the lower portions for securing the clamp ring to the block.

When clamp rings are used, it is unnecessary to provide longitudinal freedom between the rear clamp ring and block as the clamps may be slipped along the telescope barrel to any desired position to compensate for varying spacing of the tapped holes in the receiver ring and bridge. Thus, while rear clamp ring 160 is completely compatible with the blocks discussed above (such as blocks 60 and 113), it can also be secured to a block which lacks the longitudinal freedom arising from a pair of elongated grooves or faces on the block. For example, a pair of laterally opposed depressions in a rear block to receive the points of setscrews 164 would be an adequate way of securing rear clamp ring 160 to the block.

Figure 14:
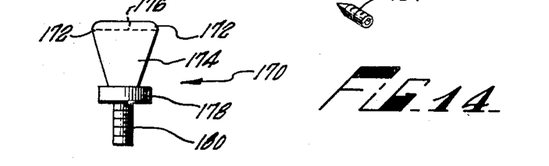
FIG. 14 is an elevation of an alternative form of a pin useful in the mounting.

In yet another alternative form of the invention, an elevation adjustment may be incorporated in the telescope mounting by using a modified round pin 170 as shown in FIG. 14. This pin is generally similar to pin 50 already described, but includes a rounded top portion 172 above a telescope-engaging portion 174 which is formed as an inverted, truncated cone. The top portion includes a screwdriver slot 176. The lower end of the telescope-engaging portion is secured to a base 178, and a threaded lower portion 180 extends downwardly from the base for engagement in one of the tapped holes in the rifle receiver. The diameter of base 178 is smaller than the diameter of the rounded top portion.

Pin 170 is used in conjunction with a telescope having a socket portion 32 as already described, and a block-and-post combination such as block 60 and post 79, or block 113 and post 123 discussed above. The rounded top portion permits the socket portion to pivot around the pin as the rear of the telescope mounting is raised or lowered by adjusting the vertical position of post 79 or 123. The reduced diameter of base 178 provides clearance for the bottom of the socket portion to permit free pivotal motion. The diameter of rounded top portion 172 is of course selected to be a snug piston-cylinder fit within socket 33 to prevent longitudinal shifting of the telescope in response to recoil shocks. Thus, while the telescope may pivot within a limited range about a lateral axis through the pin to provide an elevation adjustment, it is still secured against longitudinal motion by the snug fore-and-aft-fit of the pin and socket.

The concept of the invention also extends to the use of two clamp rings with two conically shaped pins threaded into the receiver. As already described, variations in longitudinal spacing of the sets of tapped holes in the receiver ring and bridge can be compensated by adjusting the position of the clamp rings along the barrel. It is still necessary, however, to provide compensation for variations in height of the receiver ring and bridge if mounting universality is to be achieved. This is accomplished by using a variable-height pin assembly with one of the clamp rings, the pin height being set to compensate for receiver height variations.

Figure 15:
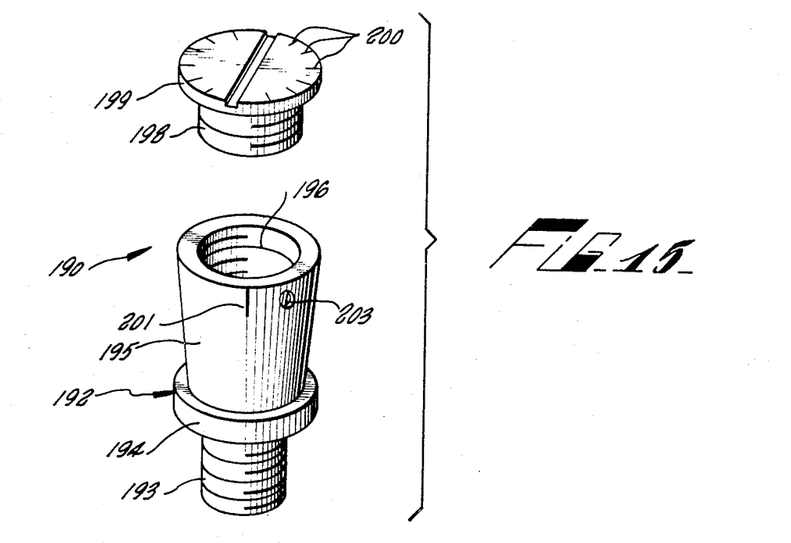
FIG. 15 is a perspective view of a variable-height pin assembly.

Referring to FIG. 15, a variable-height pin assembly 190 includes a pin 192 having a threaded lower portion 193 extending downwardly from a base 194, and a telescope-engaging portion 195 extending upwardly from the base and formed as an inverted, truncated cone. The top of the pin has a threaded bore 196 to receive a threaded post 198 having a screwdriver-slotted top portion 199.

Preferably, top portion 199 of the post includes a plurality of radial index marks 200, and a single index mark 201 is formed at the upper end of telescope-engaging portion 195. The post can be reproducibly positioned in the pin by first threading the post tightly into bore 196, and then backing the post out of the bore a specified number of turns and fractions of turns. The post is secured at a desired height by a setscrew 203 threaded laterally through the telescope-engaging portion of the pin.

In use, the variable-height pin assembly is threaded into the lower one of a pair of threaded holes in the rifle receiver as already described. A pin 50 or 170 (as discussed above) is threaded into the other hole in the higher part of the receiver. Threaded post 198 is then positioned in pin 192 so the upper surface of the post is level with the upper surface of pin 50 or 170.

Figure 16:
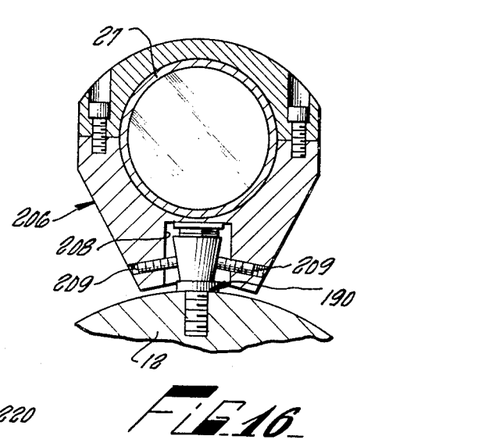
FIG. 16 is an elevation, partly in cross section, of an assembled clamp ring and pin.

A clamp ring 150 (see FIG. 13) is then secured to the telescope barrel and to pin 50 or 170 to draw the undersurface of the clamp ring tightly against the higher part of the receiver. A second clamp ring 206 is installed on the telescope barrel and secured to the variable-height pin assembly to abut the top of the post as shown in FIG. 16. Clamp ring 206 is similar in construction to clamp ring 150, but includes a laterally elongated socket 208 to receive the pin assembly, the front and back walls of the socket fitting snugly against the front and back sides of the post. The clearance provided between the lateral walls of the elongated socket and the sides of post 198 permits differential adjustment of a pair of setscrews 209 (threaded laterally through the walls of the socket) for a windage setting of the telescope. When pin 170 is used with clamp ring 150, the threaded post may also be adjusted up or down to provide an elevation setting for the telescope.

Figure 17:
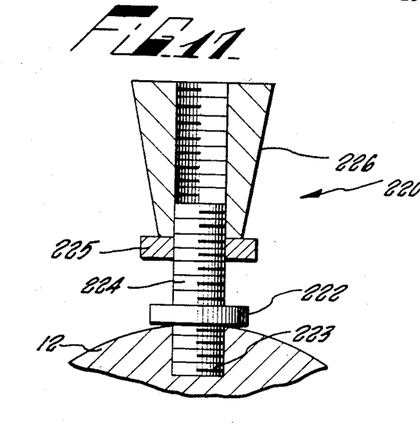
FIG. 17 is an elevation, partly in cross section, of an alternative variable-height pin assembly.

An alternative form of a variable-height pin assembly 220 is shown in FIG. 17, and includes a base 222 having a threaded lower portion 223 extending downwardly therefrom. A threaded stud 224 extends upwardly from the base portion, and a lock nut 225 is threaded on the stud. An internally threaded, telescope-engaging portion 226, formed as an inverted, truncated cone, is threaded on the stud above the lock nut. The telescope-engaging portion is positioned at a desired height above the base, and then locked in place with the lock nut.

The variable-height pin assembly may of course also be constructed with washers or spacers of a specific thickness to achieve the desired height of the top of the assembly. The threaded assemblies just described are preferred, however, as the maintenance of an inventory of washers or spacers is avoided. Another alternative method is to form partial threads in the front and back walls of laterally elongated socket 208 of the clamp ring. A plug is then threaded into the socket, and the clamp ring is installed over a pin 50 or 170 so the top of the pin abuts the undersurface of the plug. The plug position is adjusted to achieve the desired height of the telescope barrel above the receiver.

Figure 18:
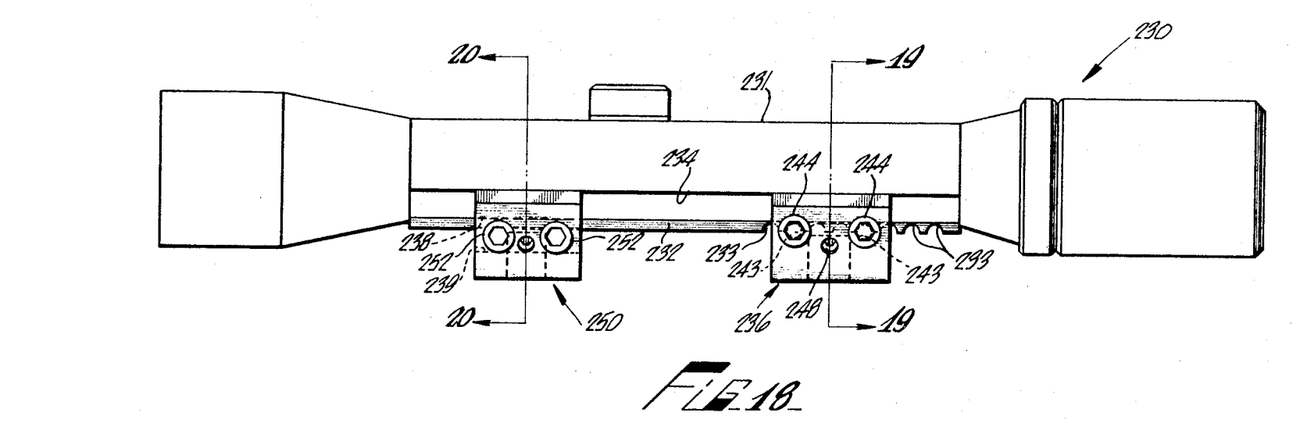
FIG. 18 is a side elevation of another form of the invention in which a pair of mounting blocks are engaged in a dovetail section of a telescope.
Figure 19:
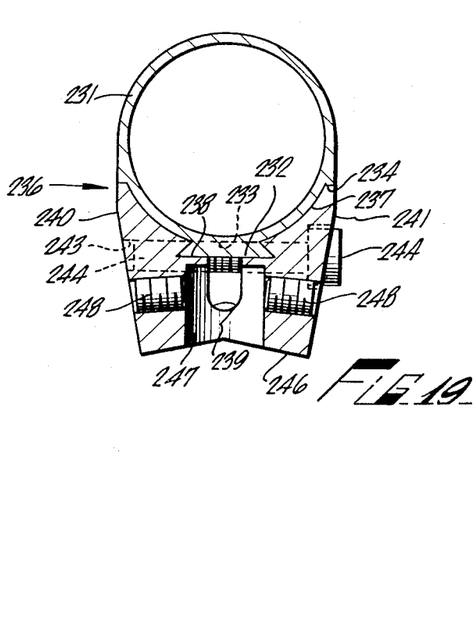
FIG. 19 is a view along line 19—19 of FIG. 18.
Figure 20:
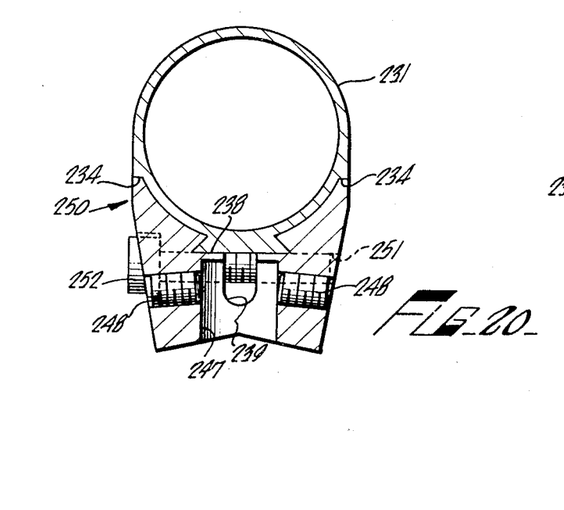
FIG. 20 is a view along line 20—20 of FIG. 18.

Another form of the invention is shown in FIGS. 18–20, and includes a telescope 230 having a barrel 231. A rib 232, formed to define the male portion of a dovetail joint, extends longitudinally along the undersurface of the barrel. A plurality of half-round lateral grooves 233 are formed laterally through the rib adjacent one of its ends. A step 234 is integrally formed in each side of the telescope barrel.

A rear block 236 has an upper surface 237 formed to fit snugly against the undersurface of barrel 231 against steps 234. The upper surface defines a dovetail slot 238 extending longitudinally therethrough so the block can be slipped into engagement with the male dovetail portion of rib 232 after the ocular or objective lens housing is removed. A channel 239 extends from the floor of slot 238 downwardly (as viewed in FIG. 19) toward the bottom of the block, and is formed longitudinally through the block. Channel 239 adds resiliency to opposed sides 240 and 241 of the block, permitting the block to be securely tightened against the telescope barrel and rib 232.

A pair of lateral holes 243 extend through sides 240 and 241 of the block, and the holes are threaded in side 240 to receive members such as a pair of screws 244 to lock the block to the telescope barrel. Holes 243 are longitudinally spaced apart a distance corresponding to the indexing of grooves 233 in the rib, and are positioned vertically whereby the bodies of screws 244 fit snugly into grooves 233. Thus, as best seen in FIG. 19, the upper portions of screws 244 mate with grooves 233 in the barrel rib, securely locking the block to the barrel and preventing relative longitudinal motion of these components during recoil shock of the firearm.

An undersurface 246 of block 236 is generally V-shaped to fit snugly against the frame of a firearm, and this undersurface is bored to define a circular socket 247. A pair of laterally opposed setscrews 248 are threaded through opposite sides of the block to extend inwardly and upwardly into the socket. Socket 247 and the associated setscrews are identical to socket 33 and setscrews 34 already described in detail above.

A front block 250 is identical to rear block 236 with the exception that the front block has a pair of laterally extending holes 251 which pass under the male dovetail portion of rib 232 as seen in FIG. 20. The right ends (as viewed in FIG. 20) of holes 251 are threaded to receive a pair of screws 252 which pass under rib 232 to lock the front block to the telescope barrel. When screws 252 are loosened, the front block is thus free to slide along the rib to be positioned as desired along the length of the telescope barrel.

The blocks are secured to a pair of pins such as pin 50 shown in FIG. 3, pin 190 shown in FIG. 15, or pin 220 shown in FIG. 17. As described above, the pins are secured in a pair of drilled and tapped holes in the frame of a firearm to which the telescope is to be secured. The blocks are installed over the pins and secured in place with setscrews 248 in the manner already described. Rear block 236 is positioned to place screws 244 through a pair of grooves 233 which will provide a desired eye-relief position for the telescope. Front block 250 is slipped along the dovetail section of rib 232 to space the blocks apart so sockets 247 are in alignment with the pins on the firearm frame.

The mounting shown in FIGS. 18–20 is especially well adapted for use on shotguns or pistols which may lack pre-drilled and tapped holes to accept pins such as pin 50. With a breakopen-action shotgun, such holes can be drilled and tapped in the rib which is typically formed along the top of the shotgun barrel. With an automatic or pump-action shotgun, the holes can be drilled and tapped in the receiver area of the shotgun frame. With a pistol, the holes can be drilled and tapped into the top strap of a revolver, or into the upper portion of the frame of an automatic pistol. If only a small mounting area is available (as, for example, on the strap of a small revolver), block 236 alone can be used to mount the telescope. In such an application, block 236 can be made slightly longer than shown in FIG. 18 such that V-shaped undersurface 246 clamps tightly against the firearm to resist forces tending to twist the block around the pin.

There has been described a universal telescope mounting which is useful in securing a telescope to almost any modern rifle without the use of custom-fitted mounting bases which are usable on only one or a limited number of rifles. The universality of the mount stems from its ability to compensate for variations in spacing of the factory drilled and tapped holes in a rifle receiver, as well as variations in height of different portions of the receiver. Although the invention has been described in terms of its application to a bolt-action rifle, it is to be understood that it is also useful with lever or pump-action rifles as well as automatic rifles. These different styles of firearms are typically provided with factory drilled and tapped holes in the receiver area, and are therefore compatible with the telescope mounting described above. The telescope mounting is also useful on pistols or shotguns which are adapted to the mounting by drilling and tapping a pair of holes to receive the mounting pins or pin and block.

I claim:

1. A telescope mounting for a firearm having a frame with a plurality of longitudinally spaced holes, comprising a pin adapted to be secured to the frame in one of the holes, the pin having a telescope-engaging portion which extends above the frame when the pin is secured to the frame; an elongated block adapted to be secured to the frame at another of the holes to be longitudinally spaced from the pin, the block having a pair of sides which extend above the frame, at least one side having a longitudinally elongated groove; a telescope having a socket dimensioned to fit snugly over the telescope-engaging portion of the pin whereby there is substantially zero longitudinal freedom between the socket and the pin; and clamp means secured to the telescope and longitudinally spaced from the socket to be engageable in the block groove whereby the telescope is clamped to the block.

2. The telescope mounting defined in claim 1 in which each side of the block includes a plurality of vertically spaced grooves, each groove being in lateral alignment with a respective groove in the opposite side of the block, and the clamp means is engaged in a pair of laterally aligned grooves.

3. The telescope mounting defined in claim 2 in which the clamp means comprises a first clamp ring secured around the telescope, the first clamp ring having a pair of lower portions which extend toward the firearm frame adjacent opposite sides of the block, and a pair of laterally opposed screws threaded through the respective lower portions to bear against the block in the laterally aligned grooves; and in which the telescope includes a second clamp ring spaced from the first clamp ring and secured around the telescope, the underside of the second clamp ring having an aperture defining the socket, and a pair of laterally opposed screws threaded through the second clamp ring to bear against the telescope-engaging portion of the pin.

4. The telescope mounting defined in claim 2 in which the telescope has a barrel and in which the clamp means comprises a pair of lower portions integral with and extending downwardly from the barrel toward the firearm frame adjacent opposite sides of the block, and a pair of laterally opposed screws threaded through the respective lower portions to bear against the block in the laterally aligned grooves.

5. The telescope mounting defined in claim 4 in which each lower portion includes a plurality of longitudinally and vertically spaced threaded holes to receive the screw.

6. The telescope mounting defined in claim 2 in which the block includes a pair of longitudinally spaced, recessed holes extending vertically therethrough, and further comprising a pair of screws extending through the holes and threaded into a pair of holes in the firearm frame to secure the block to the frame.

7. The telescope mounting defined in claim 6 in which one of the recessed holes is longitudinally elongated to accommodate the block to variable spacing of the holes in the firearm frame.

8. The telescope mounting defined in claim 2 and further comprising a post adjustably secured to the block and extending above the block under the telescope, the post being positionable at a selectable height above the block whereby the telescope bears against the post when the clamp means is engaged in the block grooves.

9. The telescope mounting defined in claim 1 in which the pin has a threaded lower portion to engage the firearm frame, and the telescope-engaging portion includes an inverted, truncated conical section.

10. The telescope mounting defined in claim 9 in which the telescope has a barrel for mounting an optical system, and in which a socket portion is formed integrally with and extending downwardly from the barrel, the socket portion having an aperture in its undersurface to define the socket, and a pair of screws threaded through opposite sides of the socket portion to bear on the conical section whereby an undersurface of the socket portion is urged toward and clamped against the firearm frame.

11. The telescope mounting defined in claim 10 in which the clamp means comprises a pair of lower portions integral with and extending downwardly from the barrel toward the firearm frame adjacent opposite sides of the block, and a pair of laterally opposed screws threaded through the respective lower portions to bear against the block in the laterally aligned grooves.

12. A telescope mounting for a firearm having a frame with a plurality of threaded, longitudinally spaced holes, comprising a pin adapted to be secured to the frame in one of the holes, the pin having a telescope-engaging portion which extends above the frame when the pin is secured to the frame; an elongated block adapted to be secured to the frame at another of the holes to be longitudinally spaced from the pin, the block having a pair of sides which extend above the frame, the sides having major planes which diverge laterally away from each other with increasing distance above the frame; a telescope having a portion defining a socket dimensioned to fit snugly over the telescope-engaging portion of the pin whereby there is substantially zero longitudinal freedom between the socket and the pin; and clamp means secured to the telescope and longitudinally spaced from the socket to be clamped against the diverging block sides whereby the telescope is secured to the block.

13. The telescope mounting defined in claim 12 in which the block includes a pair of longitudinally spaced, recessed holes extending vertically therethrough, one of the holes being longitudinally elongated to accommodate the block to variable spacing of the threaded holes in the frame, and further comprising a pair of screws extending through the holes for engagement in a pair of threaded holes in the frame to secure the block to the receiver.

14. The telescope mounting defined in claim 13 and further comprising a post adjustably secured to the block and extending above the block under the telescope, the post being positionable at a selectable height above the block whereby the telescope bears against the post when the clamp means is clamped against the block.

15. The telescope mounting defined in claim 14 in which the telescope has a barrel, and in which the clamp means comprises a pair of lower portions secured to and extending downwardly from the barrel toward the firearm frame adjacent opposite sides of the block, and a pair of laterally opposed screws threaded through the respective lower portions to bear against the diverging block sides.

16. The telescope mounting defined in claim 15 in which the lower portions and the socket portion are integral with the telescope barrel.

17. A telescope mounting for a firearm having a frame with a pair of threaded, longitudinally spaced holes, comprising an integral, substantially round pin having a threaded lower portion engageable in one of the holes, and having an upper portion which extends above the frame when the lower portion is secured to the frame, the pin upper portion having a varying circular cross section which varies from a first diameter to a second diameter substantially smaller that the first diameter, a telescope having a portion defining a socket dimensioned to fit snugly over the first diameter of the upper portion of the pin whereby there is substantially zero longitudinal freedom between the socket and the pin, a locking means engaged with the socket-defining telescope portion and bearing against the upper portion of the pin at the second diameter, and clamp means secured to the telescope, longitudinally spaced from the socket, and engageable in the other of the holes for clamping the telescope to the frame.

18. The telescope mounting defined in claim 17 in which the upper portion of the pin includes an inverted, truncated conical section, and in which the locking means comprises a pair of opposed screws threaded laterally through the socket portion of the telescope into the socket to bear on opposite sides of the conical section whereby the telescope is clamped against the frame.

19. The telescope mounting defined in claim 18 in which the screws have longitudinal axes which are substantially perpendicular to the conical section of the pin.

20. The telescope mounting defined in claim 18 in which the pin has a rounded top portion whereby the telescope may pivot about a lateral axis of the pin, and in which the clamp means includes vertical positioning means for adjusting the elevation alignment of the telescope.

21. The telescope mounting defined in claim 20 in which the clamp means includes lateral positioning means for adjusting the windage alignment of the telescope.

22. The telescope mounting defined in claim 18 in which the socket portion of the telescope comprises a clamp ring secured around the telescope, the underside of the clamp ring having an aperture defining the socket.

23. The telescope mounting defined in claim 22 in which the clamp means comprises an adjustable height pin assembly threaded into the other of the holes, a second clamp ring secured around the telescope, the underside of the second clamp ring having a socket to receive the pin assembly, and means for securing the second clamp ring to the pin assembly.

24. The telescope mounting defined in claim 18 in which the clamp means comprises a second integral, substantially round pin having a threaded lower portion engageable in the other of the holes, the second pin having an upper portion which extends above the firearm frame when the lower portion is secured to the frame, the upper portion of the second pin including an inverted, truncated conical section, a second portion secured to the telescope and defining a second socket dimensioned to fit over the upper portion of the second pin, and a second pair of opposed screws threaded laterally through the second socket portion of the telescope into the second socket to bear on opposite sides of the conical section of the second pin.

25. The telescope mounting defined in claim 24 in which the telescope has a barrel for mounting an optical system, and the two socket portions are formed integrally with the barrel and extend below the barrel toward the firearm frame.

26. A telescope mounting for a firearm having a frame with a first threaded hole, comprising a substantially round pin having a threaded lower portion engageable in the hole, and having an upper portion which extends above the frame when the lower portion is secured to the frame, the upper portion including an inverted, truncated conical section; a telescope having a longitudinally elongated rib, the rib having a lateral groove therethrough; a block adapted to engage the rib in longitudinally sliding and laterally locked fashion, the block having a lateral hole in alignment with the lateral groove when the block and the rib are engaged, the block further having a portion defining a socket dimensioned to fit snugly over the upper portion of the pin whereby there is substantially zero longitudinal freedom between the socket and the pin; a pair of opposed screws threaded laterally through the socket portion of the block into the socket to bear on opposite sides of the conical section of the pin; and a member secured in the block lateral hole and fitting snugly in the rib lateral groove to lock the block to the rib whereby longitudinal sliding is prevented.

27. The telescope mounting defined in claim 26 in which the block has a V-shaped undersurface to fit against the firearm frame.

28. The telescope mounting defined in claim 26 in which the firearm frame includes a second threaded hole, the first and second holes being longitudinally spaced apart, and further comprising clamp means engaged with the telescope rib, longitudinally spaced from the block, and engageable in the second threaded hole.

29. The telescope mounting defined in claim 28 in which the rib has a dovetail cross section and has a plurality of longitudinally spaced lateral grooves, and in which the block has a mating dovetail cross section to engage the rib.

30. The telescope mounting defined in claim 29 in which the clamp means comprises a second substantially round pin having a threaded lower portion engageable in the second threaded hole in the firearm frame, and having an upper portion which extends above the frame when the lower portion is secured to the frame, the upper portion including an inverted, truncated conical section, a second block having a mating dovetail section to engage the telescope rib, and having a portion defining a socket dimensioned to fit snugly over the second pin, a screw threaded laterally through the second block to clamp the block to the rib, and a pair of opposed screws threaded laterally through the socket portion of the second block into the socket to bear on opposite sides of the conical section of the pin.

References Cited
UNITED STATES PATENTS

| 2,774,142 | 12/1956 | Lake et al. | 33—50 |
| 2,830,373 | 4/1958 | Dahlberg | 33—50 |
| 2,857,675 | 10/1958 | Kesselring | 33—50 |

ROY D. FRAZIER, *Primary Examiner.*

J. F. FOSS, *Assistant Examiner.*